US009100562B2

(12) United States Patent
Mohan et al.

(10) Patent No.: US 9,100,562 B2
(45) Date of Patent: Aug. 4, 2015

(54) METHODS AND APPARATUS FOR COORDINATED LENS AND SENSOR MOTION

(75) Inventors: Ankit Mohan, North Cambridge, MA (US); Douglas Lanman, Somerville, MA (US); Shinsaku Hiura, Hyogo (JP); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1135 days.

(21) Appl. No.: 12/758,230

(22) Filed: Apr. 12, 2010

(65) Prior Publication Data
US 2010/0259670 A1    Oct. 14, 2010

Related U.S. Application Data

(60) Provisional application No. 61/168,880, filed on Apr. 13, 2009.

(51) Int. Cl.
*H04N 5/232* (2006.01)
*H04N 5/262* (2006.01)

(52) U.S. Cl.
CPC ........... *H04N 5/232* (2013.01); *H04N 5/23248* (2013.01); *H04N 5/23287* (2013.01); *H04N 5/262* (2013.01)

(58) Field of Classification Search
USPC .................................. 348/221.1, 208.12, 362
See application file for complete search history.

(56) References Cited

U.S. PATENT DOCUMENTS

| | | | |
|---|---|---|---|
| 4,780,739 A | 10/1988 | Kawakami et al. | |
| 5,270,857 A | 12/1993 | Oizumi et al. | |
| 6,118,474 A * | 9/2000 | Nayar | 348/36 |
| 6,444,967 B1 * | 9/2002 | Kosuge et al. | 250/201.3 |
| 7,132,824 B2 | 11/2006 | Masuda et al. | |
| 7,319,815 B2 | 1/2008 | Seo | |
| 7,432,635 B2 * | 10/2008 | Kawai | 310/323.17 |
| 7,477,842 B2 * | 1/2009 | Gutierrez | 396/133 |
| 7,604,171 B2 * | 10/2009 | Chang | 235/454 |
| 2003/0043267 A1 * | 3/2003 | Matsumiya et al. | 348/86 |
| 2005/0140793 A1 * | 6/2005 | Kojima et al. | 348/208.99 |
| 2006/0221248 A1 * | 10/2006 | McGuire et al. | 348/587 |

(Continued)

OTHER PUBLICATIONS

Bae, S., Durand, F.; Defocus magnification. In Eurographics, vol. 26, pp. 571-579, 2007.

(Continued)

*Primary Examiner* — Nicholas Giles
*Assistant Examiner* — Tuan Le
(74) *Attorney, Agent, or Firm* — Stephen R. Otis

(57) ABSTRACT

In exemplary implements of this invention, a lens and sensor of a camera are intentionally destabilized (i.e., shifted relative to the scene being imaged) in order to create defocus effects. That is, actuators in a camera move a lens and a sensor, relative to the scene being imaged, while the camera takes a photograph. This motion simulates a larger aperture size (shallower depth of field). Thus, by translating a lens and a sensor while taking a photo, a camera with a small aperture (such as a cell phone or small point and shoot camera) may simulate the shallow DOF that can be achieved with a professional SLR camera. This invention may be implemented in such a way that programmable defocus effects may be achieved. Also, approximately depth-invariant defocus blur size may be achieved over a range of depths, in some embodiments of this invention.

19 Claims, 13 Drawing Sheets

(5 of 13 Drawing Sheet(s) Filed in Color)

(56) References Cited

U.S. PATENT DOCUMENTS

| | | | |
|---|---|---|---|
| 2007/0070226 A1* | 3/2007 | Matusik et al. | 348/275 |
| 2007/0297779 A1* | 12/2007 | Fujisaki et al. | 396/55 |
| 2009/0072666 A1* | 3/2009 | Ishiguro et al. | 310/323.16 |
| 2009/0086040 A1* | 4/2009 | Ohno | 348/208.99 |
| 2010/0238321 A1* | 9/2010 | Honjo et al. | 348/231.99 |

OTHER PUBLICATIONS

Cathey, W. T., Dowski, E. R.; New paradigm for imaging systems. Applied Optics, 41(29):6080-6092, 2002.

Georgiev, T., Zheng, K. C.,Curless, B., Salesin, D., Nayar, S., Intwala, C.; Spatio-angular resolution tradeoffs in integral photography. In EGSR, pp. 263-272, 2006.

Gondrom, S., Schropfer, S., Saarbrucken, D.; Digital computed laminography and tomosynthesis. In Computerized Tomography for Industrial Applications and Image Processing in Radiology, 1999.

Hasinoff, S. W., Kutulakos, K. N.; A layer-based restoration framework for variable-aperture photography. In IEEE ICCV, pp. 1-8, 2007.

Hausler, G.; A method to increase the depth of focus by two step image processing. Optics Comm., 6(1):38-42, 1972.

Gilmore, J., Bulayev, Y.; Charge-Coupled Devices: CCD advances improve TDI imaging techniques, 2007, accessed online on May 25, 2013 at http:/lwww.laserfocusworld.com /display_article/282673/12/none/none/Feat/CHARGE-COUPLEDDEVICES:-CCD-advances-improve-TDI-imaging-technique.

Piestun, R., Schechner, Y. Y., Shamir, J.; Propagation invariant wave fields with finite energy. JOSA A, 17 (2):294-303, 2000.

Veeraraghavan, A., Raskar, R., Agrawal, A., ,Mohan, A., Tumblin, J.; Dappled photography: Mask enhanced cameras for heterodyned light fields and coded aperture refocusing. In SIGGRAPH, vol. 26. ACM, 2007.

Zomet, A., Nayar, S. K.; Lensless imaging with a controllable aperture. In IEEE CVPR, pp. 339-346, 2006.

* cited by examiner

METHODS AND APPARATUS FOR COORDINATED LENS AND SENSOR MOTION

RELATED APPLICATION

This application claims the benefit of U.S. Provisional Application Ser. No. 6116880, filed Apr. 13, 2009, the entire disclosure of which is herein incorporated by reference.

FIELD OF THE TECHNOLOGY

The present invention relates to cameras.

BACKGROUND

When taking a photograph, it is sometimes desirable to have a shallow depth of field (DOF). This allows one to achieve artistic effects, in which a portion of the scene is in focus and the remainder of the scene is out of focus. For example, one may use a shallow DOF so that a flower in a scene appears in sharp focus and the more distant background appears out of focus. This prevents the flower from being lost against the background.

Depth of field depends on a number of factors, including the aperture size of the camera. The larger the aperture, the shallower is the DOF.

Shallow DOF (large aperture) may be achieved with professional SLR cameras. Unfortunately, less expensive cameras (such as cell phone cameras and small point and shoot cameras) typically have small lens apertures that cannot achieve such shallow DOF, and thus cannot create the same artistic defocus effects that may be achieved with a professional SLR camera.

SUMMARY

In exemplary implements of this invention, a lens and sensor of a camera are intentionally destabilized (i.e., shifted relative to the scene being imaged) in order to create defocus effects. That is, actuators in a camera move a lens and a sensor, relative to the scene being imaged, while the camera takes a photograph. This motion simulates a larger aperture size (shallower depth of field). Thus, by translating a lens and a sensor while taking a photo, a camera with a small aperture (such as a cell phone or small point and shoot camera) may simulate the shallow DOF that can be achieved with a professional SLR camera.

This invention may be implemented in such a way that programmable defocus effects may be achieved.

Also, approximately depth-invariant defocus blur size may be achieved over a range of depths, in some embodiments of this invention.

It is helpful to compare this invention to the conventional technique of image stabilization. Image stabilization involves moving either a lens or a sensor (but not both) of a camera in order to compensate for motion of the camera. It stabilizes the image, i.e., prevents the image from being defocused as a result of camera movement. In contrast, in exemplary implementations of this invention, both a lens and a sensor of a camera (rather than just one of them) are moved at the same time. The purpose of this coordinated motion is to destabilize the image, i.e., to intentionally create defocus effects and to simulate a shallower depth of field. The velocities and direction of motion of the lens and sensor may be selected in such a way as to control the defocus effects that are achieved.

This invention may be implemented as a camera that includes one or more actuators for causing a lens and a sensor of said camera, but not the camera as a whole, to move relative to the scene being imaged, at the same time that the camera captures an image. Furthermore: (1) the plane of said sensor, the plane of said lens, the direction of motion of said sensor and the direction of motion of said lens may all be substantially parallel to each other; or (2) the plane of said sensor may be substantially parallel to the plane of said lens but not substantially parallel to the direction of motion of said lens. Also, (3) said one or more actuators may be adapted for moving said lens and said sensor in such a way as to simulate a larger aperture size than the actual aperture size of said lens, (4) said one or more actuators may be adapted for moving said lens and said sensor in such a way as to achieve a substantially depth-independent defocus blur size over a range of depths, (5) said substantially depth-independent defocus blur size may be achieved over a range of depths while said lens and said sensor travel at substantially constant velocities, which range extends between the depth at which said lens and said sensor would capture an in-focus image while stationary and the depth at which, if a pinhole were substituted for said lens, said pinhole and said sensor would capture an in-focus image while traveling at said velocities. Furthermore: (6) at least one of said actuators may be a stepper motor, (7) at least one of said actuators may be piezoelectric, (8) at least one of said actuators may be ultrasonic, (9) at least one of said actuators may be further adapted for moving at least one lens or sensor of said camera under certain circumstances, in such a way as to compensate for motion of said camera, (10) said one or more actuators may be adapted for moving said lens and said sensor, each at a constant velocity for a substantial portion of the total time of said movement, (11) said one or more actuators may be adapted for moving said lens and said sensor, each at a velocity that varies substantially during a substantial portion of said movement, which portion does not include the initial acceleration or final deceleration that occur during said movement, (12) motions of said lens or said sensor may be circular, elliptical, hypocycloidal or spiral, (13) the image may be captured during a single exposure, and (14) movement of said lens and said sensor may be programmable.

This invention may be implemented as a method in which at least one actuator of a camera moves a lens and a sensor of a camera, but not the housing of a camera, relative to the scene being imaged, at the same time that the camera captures an image. Furthermore, (1) said movement of said lens and said sensor may be programmable; (2) said lens and said sensor may be moved in such a way as to simulate a larger aperture size than the actual aperture size of said lens, (3) at least one said actuator may move said lens and said sensor in such a way as to achieve a substantially depth-independent defocus blur size over a range of depths, which range extends between the depth at which said lens and said sensor would capture an in-focus image while stationary and the depth at which, if a pinhole were substituted for said lens, said pinhole and said sensor would capture an in-focus image while traveling at said velocities, and (4) at least one actuator of said camera may move at least one lens or sensor of said camera in such a way as to compensate for motion of said camera.

BRIEF DESCRIPTION OF THE DRAWINGS

The patent or application file contains at least one color photograph. Copies of this patent or patent application publication with color photograph(s) will be provided by the Office upon request and payment of the necessary fee.

In the Detailed Description of the invention that follows, reference will be made to the following drawings.

DETAILED DESCRIPTION

In exemplary implementations of this invention, actuators in a camera move a lens and a sensor of a camera, relative to the scene being imaged, while the camera takes a photograph. This motion simulates a larger aperture size (shallower depth of field).

Figure 1:
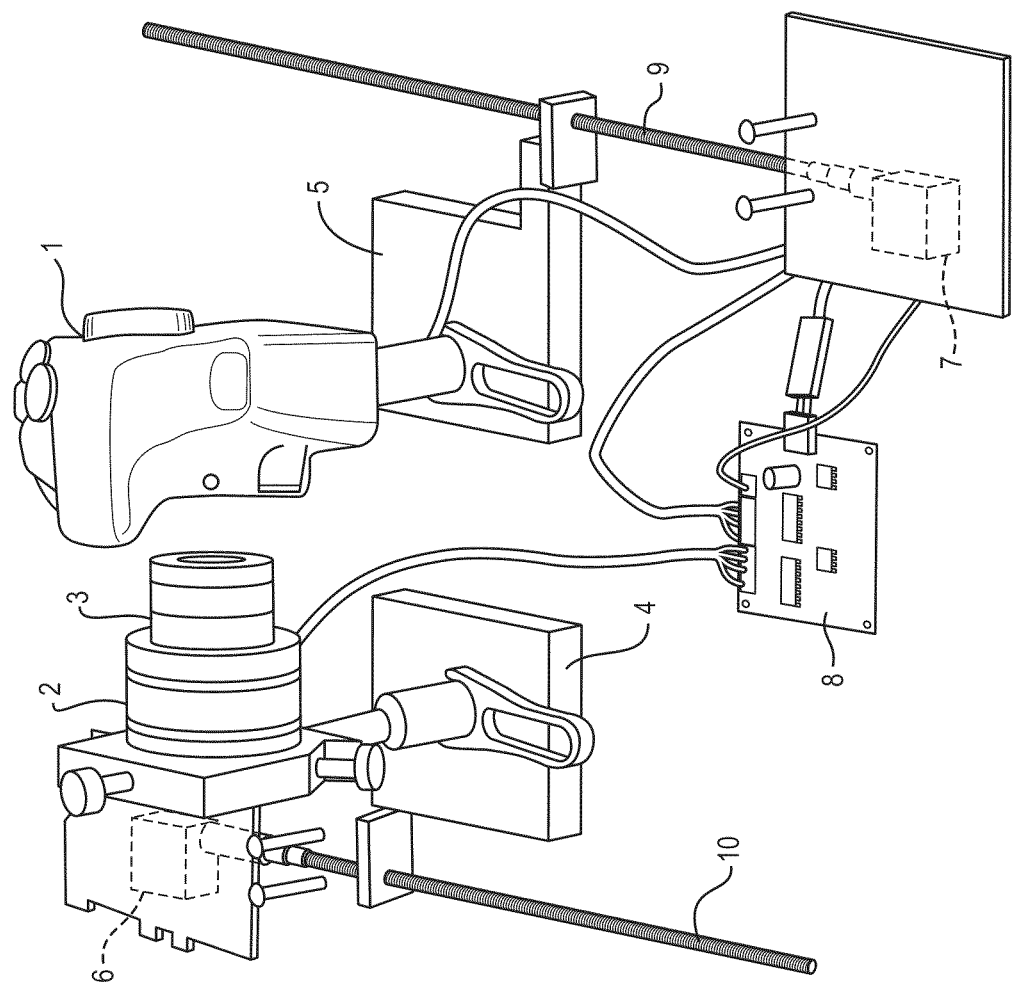
FIG. 1 is an isometric view of a prototype of this invention.
Figure 2:
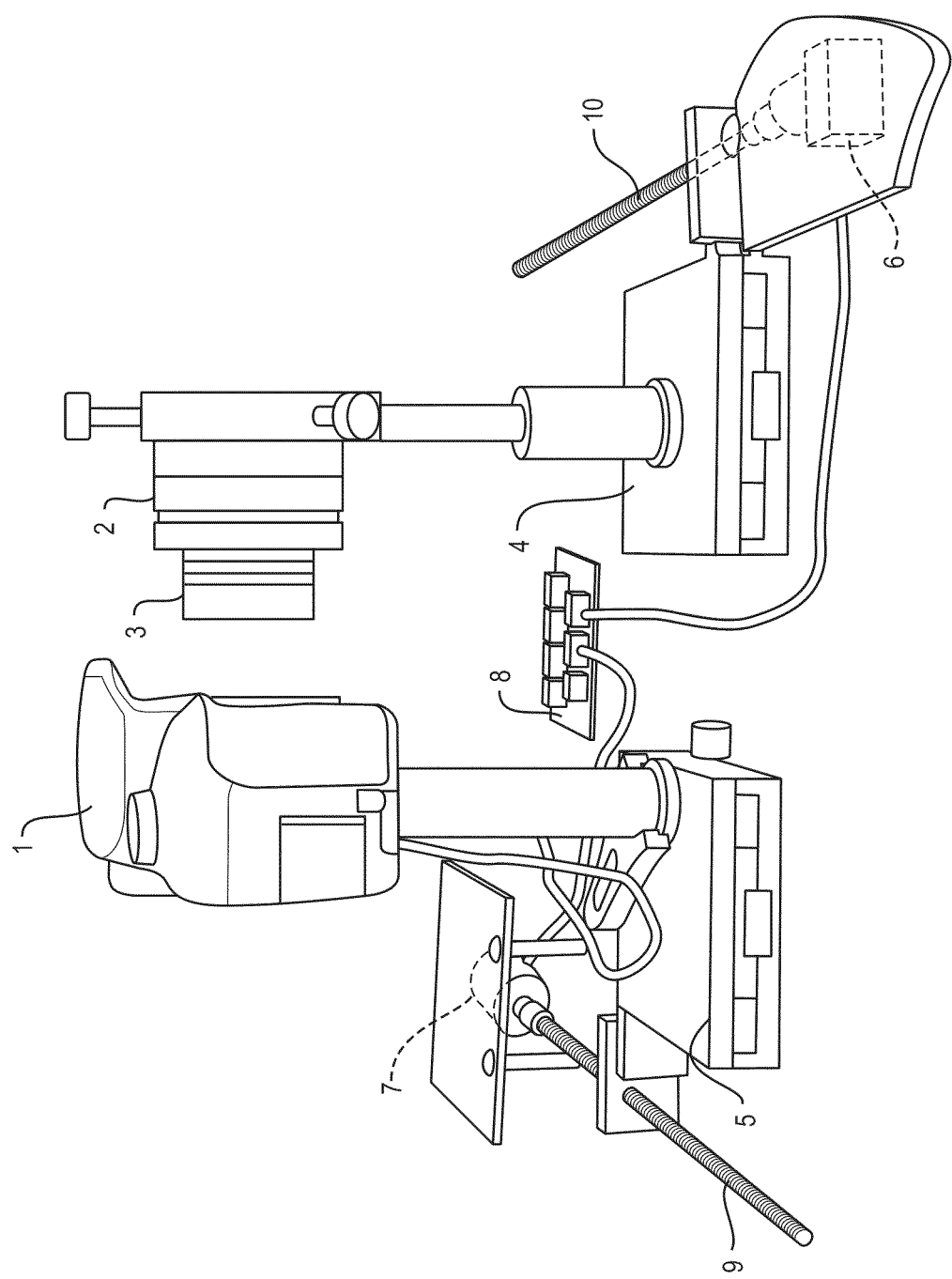
FIG. 2 is a side view of that prototype.
Figure 3:
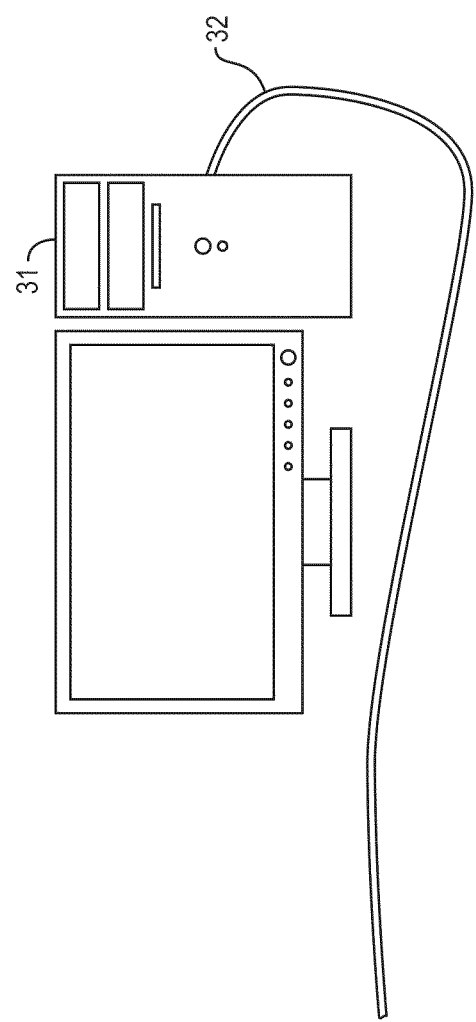
FIG. 3 is a view of a computer and USB cable used in a prototype of this invention.

FIGS. 1 and 2 are perspective views of a prototype of this invention. FIG. 3 is a side view of this prototype. In this prototype, a sensor 1 and a lens 2 are mounted on a pair of linear translation stages 4 and 5. Stepper motors make the linear translation stages (and thus the sensor and lens) move.

In this prototype, the sensor 1 is the sensor on a 12.2 megapixel Canon® EOS Digital Rebel XSi camera. The lens 2 is a Nikkor® 50 mm f/1.8D lens with manual aperture control. In addition, a second diverging lens 3 is placed behind the Nikkor lens, in order to form a focused image on the sensor. The camera and lens are enclosed in a box (not shown in FIGS. 1-2) to prevent stray light from reaching the sensor. External stepper motors 6 and 7 cause rods 9, 10 to move, driving the translation stages 4 and 5. The rods 9, 10 are parallel to each other. A circuit board 8 is employed to control the stepper motors. Exposures are timed to occur outside of the stepper motor ramp-up and ramp-down phases. In this prototype, the translation stages allow a total displacement of 4 cm and typical exposures may range from 5 to 30 seconds. In this prototype, a computer 31 (shown in FIG. 3) is used to control the camera. The computer is connected to the camera with a USB cable 32.

Before discussing how the present invention works, it is helpful to briefly review (a) focusing with a conventional static lens, (b) all-in-focus imaging with a static pinhole, and (c) defocus caused by moving the pinhole, but not the sensor, relative to the scene being imaged.

Figure 4:
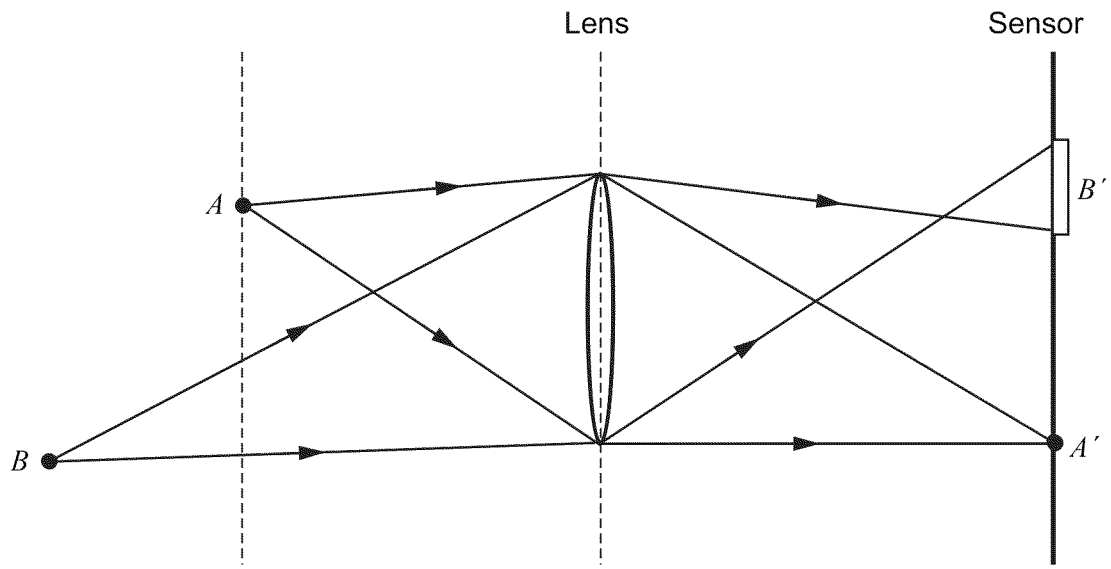
FIG. 4 is a diagram showing lens-based focusing.
Figure 5:
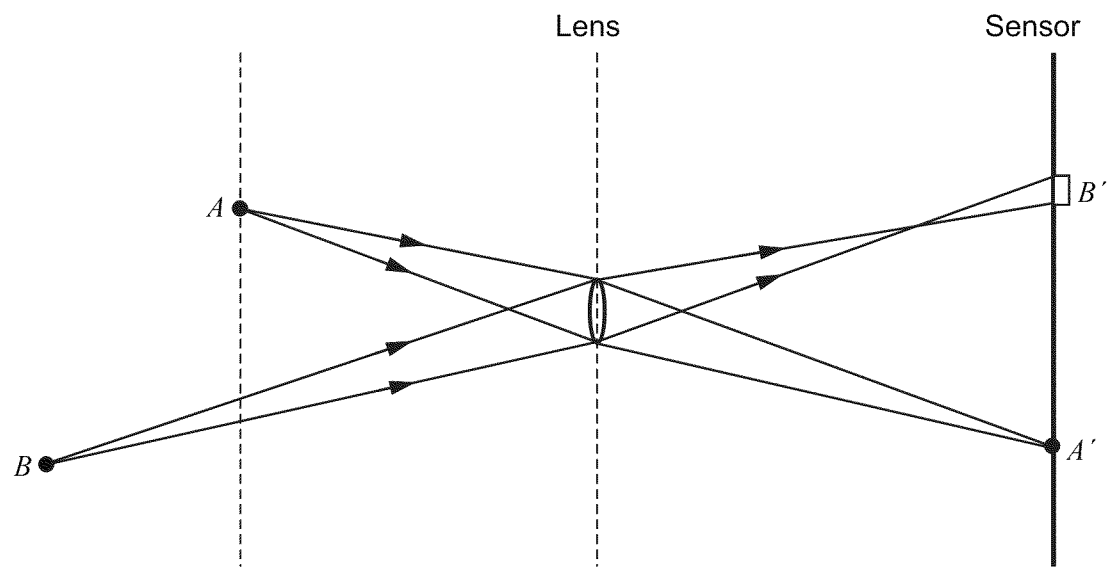
FIG. 5 is a diagram that illustrates how a smaller aperture results in a smaller defocus blur.

FIG. 4 illustrates focusing with a conventional, static lens. In FIG. 4, scene objects at a certain depth from the lens (i.e., in scene plane 41) appear in sharp focus on the sensor. Point A is at that depth; thus it is imaged as a focused point of light A' on the sensor plane. In contrast, point B is not at that depth; thus it is imaged as a defocus blur B' on the sensor plane. The size of the defocus blur is proportional to the size of the aperture. For example, as shown in FIG. 5, a smaller aperture causes a smaller defocus blur.

Figure 6:
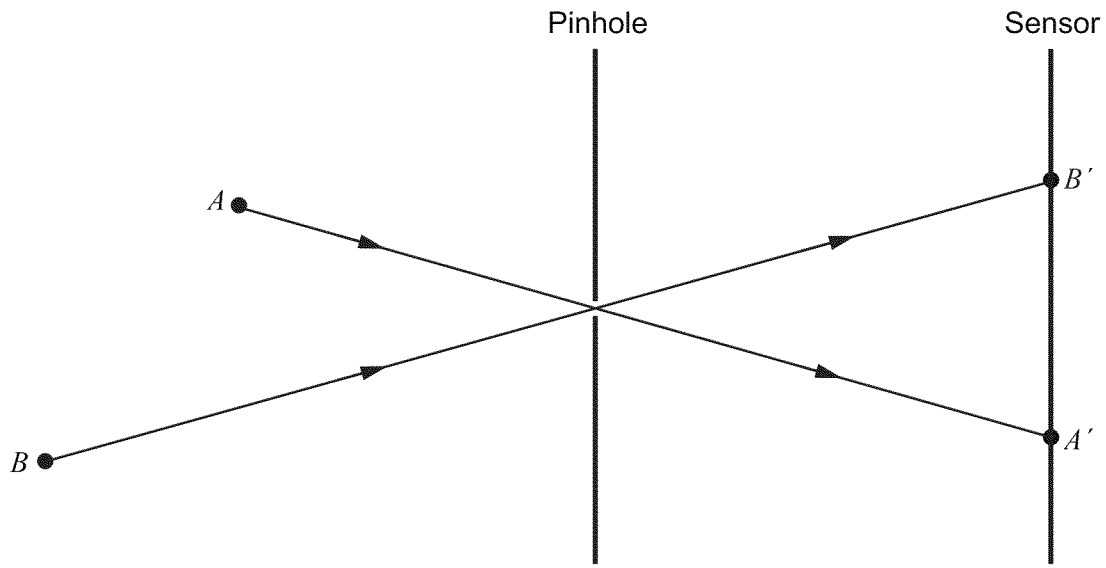
FIG. 6 is a diagram that shows how a pinhole may be used to create an all-in-focus image.

FIG. 6 illustrates how a static pinhole camera may be employed for all-in-focus imaging. FIG. 6 is a simple ray diagram for a pinhole camera, where scene points A and B are projected to points A'$_0$ and B'$_0$ on the sensor, respectively. Since the pinhole selects a single ray from each scene point, the entire scene appears focused on the sensor—irrespective of the distance of a given point from the pinhole.

Figure 7:
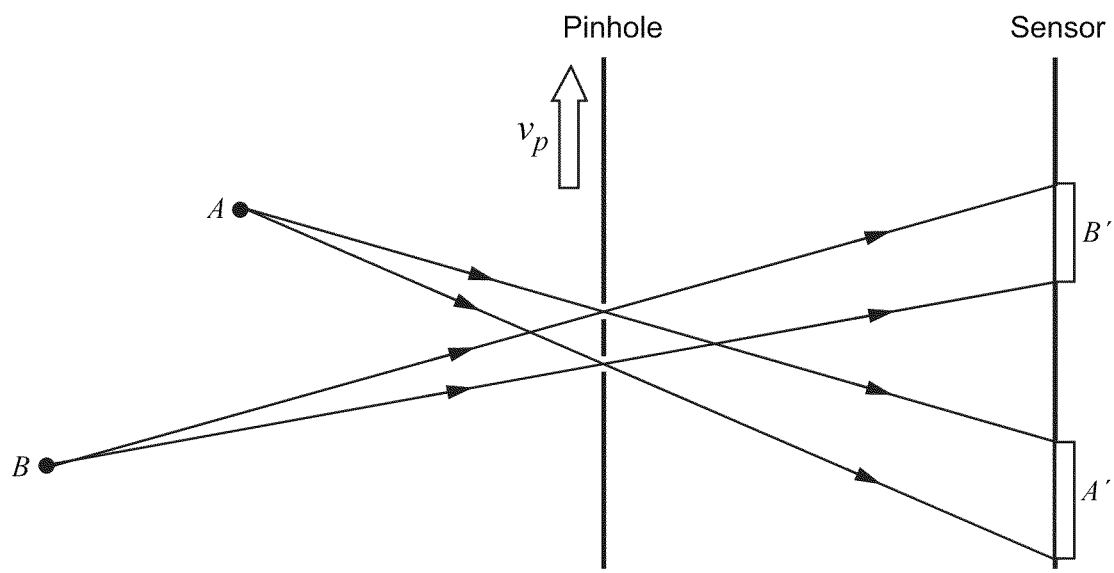
FIG. 7 is a diagram that shows a pinhole being moved during an exposure.

FIG. 7 illustrates the effect of moving the pinhole, but not the sensor, relative to the scene being imaged. As shown in FIG. 7, the pinhole is moving with velocity $v_p$ relative to the scene being imaged and the sensor. Light from points A and B are projected as defocus blurs A' and B', respectively, on the sensor plane.

Figure 8:
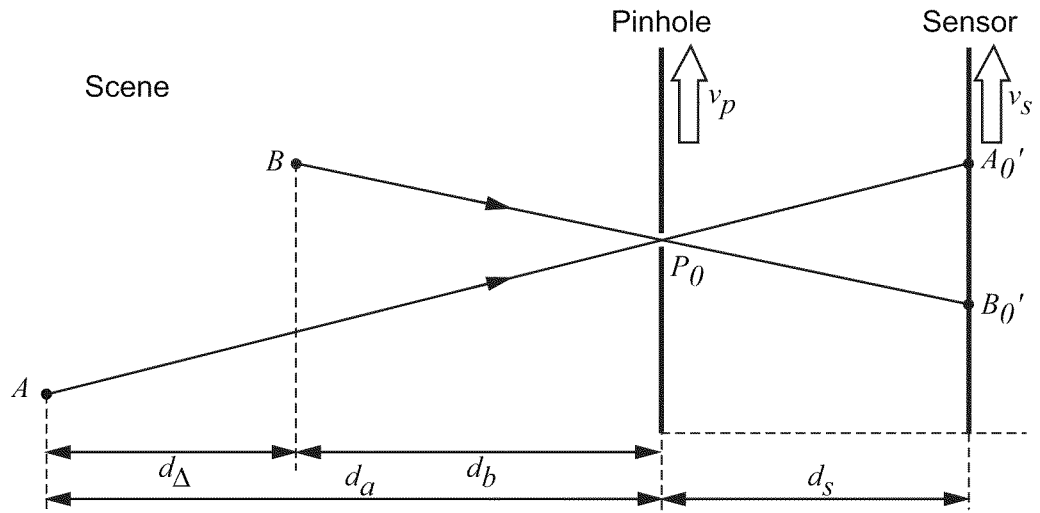
FIG. 8 is a diagram that shows both a pinhole and a sensor being moved during an exposure, in an illustrative implementation of this invention.
Figure 9:
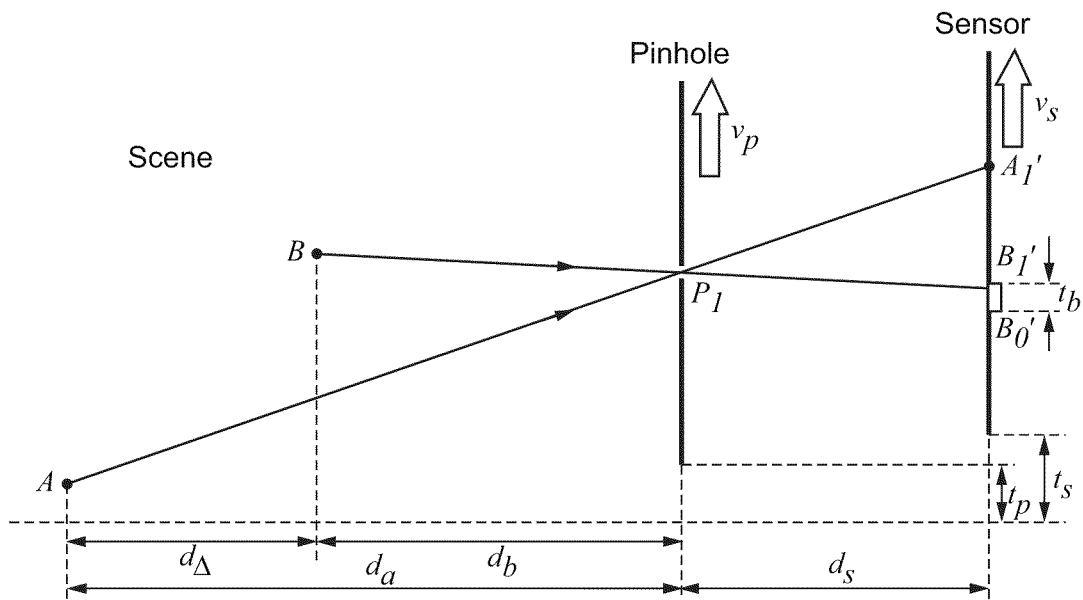
FIG. 9 is a diagram that shows both a pinhole and a sensor being moved during an exposure, in an illustrative implementation of this invention.

In an illustrative implementation of this invention, both a sensor and a pinhole are moved at the same time relative to the scene being imaged. FIGS. 8 and 9 illustrate such a configuration. The pinhole is translated at velocity $v_p$ and the sensor is translated with velocity $v_s$, each relative to the scene being imaged. The directions of motion are parallel. In this configuration, the velocities of the sensor and lens may be selected in such a way that (A) the acquired image is focused on a specific scene plane at a distance $d_a$ from the pinhole, and (B) points in other scene planes are defocused. As the pinhole moves from $P_0$ to $P_1$, the image of point A shifts from $A'_0$ to $A'_1$. To focus on the plane containing point A, the sensor must be translated such that $A'_0$ and $A'_1$ overlap. This occurs when the sensor displacement $t_s$ is given by:

$$t_s \left(1 + \frac{d_s}{d_p}\right) t_p$$

where $t_p$ is the pinhole displacement, $d_s$ is the distance between the pinhole and $d_a$ is the distance between the pinhole and the scene plane containing point A.

Since this applies to any point on the plane at a distance $d_a$ from the pinhole, a parallel translation of the pinhole and sensor may be employed to produce an image focused at $d_a$. Specifically, in this pinhole configuration, if the pinhole moves a constant velocity $v_p$ during the exposure, then the sensor must translate with a constant velocity $$v_s = \left(1 + \frac{d_s}{d_a}\right) v_p \quad (1)$$

in order for the acquired image to be focused on the scene plane at distance $d_a$ from the pinhole.

Note that, if velocities are selected in this manner in this configuration, points at a distance other than $d_a$ from the pinhole will appear defocused.

For example, consider the scene point B at a distance $d_b$ from the pinhole plane, in the configuration shown in FIGS. 8 and 9. The image of this point moves from $B'_0$ to $B'_1$ as the pinhole moves from $P_0$ to $P_1$. The total displacement $t_b$ of the image of B as the pinhole translates over a distance $t_p$ is given by $$t_b = d_s \left| \frac{1}{d_b} - \frac{1}{d_a} \right| t_p.$$

Thus, the parallel motions of the sensor and pinhole, relative to the scene being imaged, reduce the depth of field of the optical setup. For such a pinhole configuration, the diameter of the circle of confusion is then given by $$c_P = \frac{d_s}{d_a} \left( \frac{|d_\Delta|}{d_a + d_\Delta} \right) t_p \quad (2)$$

where $d_\Delta = d_b - d_a$ is the distance from the plane of focus.

The term "pinhole shift" refers to a sensor and pinhole being moved, relative to the scene being imaged, while an image is captured.

Now consider how the parallel motions of a sensor and pinhole may be used to simulate the optics of an ideal thin lens.

A thin lens is governed by the thin lens equation $$\frac{1}{f_T} = \frac{1}{u} + \frac{1}{v}, \quad (3)$$

where $f_T$ is the focal length of the thin lens, u is the object distance, and v is the image distance.

Rearranging this expression and comparing with Equation 1 (where $d_a = u$, and $d_s = v$), the virtual focal length $f_P$ for pinhole shift is given by $$f_P = \left(\frac{v_p}{v_s}\right) d_s \quad (4)$$

The diameter $C_T$ of the circle of confusion for a thin lens is given by the relation $$c_T = \frac{f_T}{d_a - f_T} \left(\frac{|d_\Delta|}{d_a + d_\Delta}\right) A, \quad (5)$$

where A is the aperture diameter of the thin lens.

Combining Equation 5 with the thin lens equation:

$$c_T = \frac{d_s}{d_a} \left(\frac{|d_\Delta|}{d_a + d_\Delta}\right) A.$$

Comparing this result with Equation 2, it is clear that the total displacement $t_p$ for pinhole shift must be equal to the aperture size A in order to replicate the circle of confusion for a given thin lens. Thus, the virtual f-number (the ratio of the virtual focal length to the virtual aperture size) for pinhole shift is given by $$N_P = \frac{f_P}{t_p} = \left(\frac{v_p}{v_s}\right)\left(\frac{d_s}{t_p}\right). \quad (6)$$

Thus, according to principles of this invention, the synchronized translation of a pinhole and sensor allows a pinhole camera to replicate the effect of an arbitrary thin lens. Adjusting the relative translation velocities $\{v_p, v_s\}$ and total displacements $\{t_p, t_s\}$ of the pinhole and sensor allows the synthesis of a thin lens with focal length $f_T$ and f-number $N_T$.

This result can also be understood by interpreting a thin lens as a uniform array of translated pinholes and prisms. Under this model, the image detected by the sensor is a linear superposition of the individual images formed by each shifted pinhole-prism pair. A local segment of the thin lens with focal length $f_T$, located a distance $t_p$ from the optical axis, acts as a pinhole followed by a prism that produces a constant angular deflection $\alpha = t_p / f_T$. Under the paraxial approximation, the prism effectively translates the resulting pinhole image by a distance $t_s$ given by $$t_s = -\alpha d_s = \frac{d_s t_p}{f_T} = \left(1 + \frac{d_s}{d_a}\right) t_p.$$

This translation $t_s$ is identical to the sensor translation given by Equation 1.

Thus, in illustrative implementations of this invention, the synchronized translation of a pinhole and the sensor effectively creates a "thin lens in time", where the pinhole translation scans the aperture plane and the sensor translation replaces the action of the local prisms.

It is often desirable to use a lens rather than a pinhole, in order to avoid loss of light and diffraction associated with pinholes. Thus, in some implementations of this invention, a lens with a finite aperture size is used instead of a pinhole. That is, a sensor and a lens with a finite aperture are moved, relative to the scene being imaged, at the same time that an image is captured.

The above analysis (regarding coordinated translation of a pinhole and sensor) can be extended to coordinated translation of a lens (with a finite aperture size) and a sensor. A pinhole can be interpreted as a thin lens with an infinitely-small aperture located at the optical center. The virtual focal length and f-number for such a configuration is given by Equations 4 and 6 and the point spread function (PSF) is a box function for 1D motions (or a pillbox for 2D) corresponding to the circle of confusion in Equation 2. As the aperture size increases, the overall PSF $h^L$ is a combination of the virtual PSF due to pinhole and sensor translation and the physical PSF due to the lens aperture. The overall PSF is given by $$h^L_{f_T,N_T,f_P,N_P}(d) = h^T_{f_T,N_T}(d) * h^P_{f_P,N_P}(d), \quad (7)$$

where $h^T$ is the physical PSF of the thin lens, $h^P$ is the virtual PSF due to sensor and lens translation, and d is the distance of the point source from the lens plane.

Thus, in exemplary implementations of this invention, translating a finite aperture lens synchronized with the sensor results in the creation of a second virtual lens, and the effective PSF of the resulting system is the convolution of the PSFs of the real and virtual lenses.

In exemplary implementations of this invention, a special case occurs where the real and virtual focal lengths are matched (i.e., $f_T=f_P$). In that special case, a shifting lens and sensor behaves very similar to a static lens of the same focal length, but with a larger effective aperture size (or smaller effective f-number). For this situation, a single plane is in focus and the size of the circle of confusion rapidly increases for scene points located away from this plane. The increased effective aperture size yields a depth of field that is shallower than what is obtained by either a static lens with f-number $N_T$ or a translating pinhole configuration with f-number $N_P$. The overall f-number $N_L$ of a shifting lens and sensor is given by $$\frac{1}{N_L} = \frac{1}{N_T} + \frac{1}{N_P},$$

where $N_P$ is the virtual f-number given by Equation 6. Even though the effective aperture size is increased, the total light entering the camera during the exposure remains identical to that allowed by the unmodified physical aperture.

The effective PSF of a shifting lens and sensor is the convolution of the real and virtual PSFs. Thus, according to principles of this invention, limitations of the physical PSF due to the lens can be addressed by engineering an appropriate virtual PSF by selecting appropriate motions for a lens and sensor. The component $h^P(d)$ depends on the relative velocities and paths (in 2D) of the lens and sensor as they translate. These parameters may in some cases easier to control than the optical elements within the lens. In exemplary implementations of this invention, coordinated translation introduces additional blur. As a result, according to principles of this invention, synchronized translation of a lens and sensor can be applied to attenuate high-frequency components in the physical PSF and improve the overall bokeh.

Figure 10A:
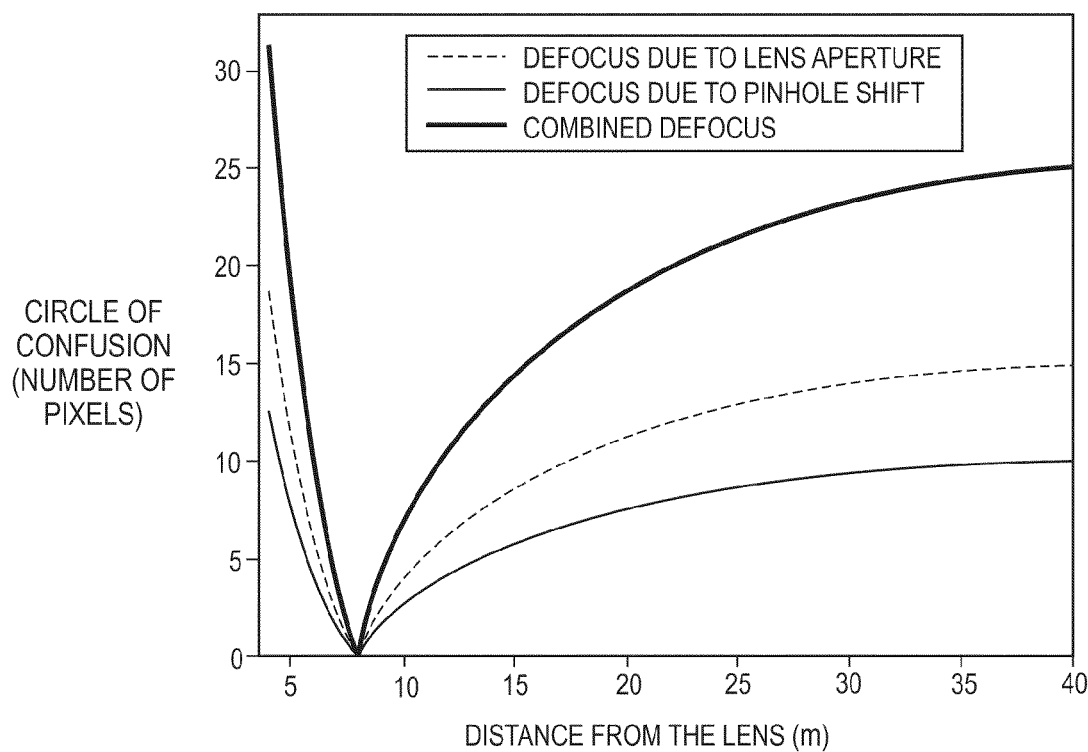
FIGS. 10A and 10B are charts that depict the size of defocus blur over a range of distances, in an illustrative implementation of this invention.

In the special case where the real and virtual focal lengths are matched (i.e., $f_T=f_P$), the size of the defocus blur due to shifting a lens and sensor is approximately equal to the sum of the size of the defocus blur due to (1) the fixed lens, and (2) pinhole shift. FIG. 10A is a chart that illustrates this. It plots the size of the circle of confusion for (a) a fixed lens, (b) pinhole shift, and (c) the combined case effect of shifting a lens and sensor. In FIG. 10A, the defocus enhancement is achieved using a lens with focal length 50 mm, aperture 15 mm, focused at 8 m, and total lens displacement of 10 mm. As shown in FIG. 10A, in the special case where the real and virtual focal lengths are matched (i.e., $f_T=f_P$), the overall size of the combined circle of confusion is approximately equal to the sum of the two cases (fixed lens and pinhole shift), and the depth of field is shallower for the combination.

In an exemplary implementation of this invention, the real and virtual focal lengths (i.e., $f_T=f_P$) may be matched in order to enhance the defocus (bokeh) effect.

Figure 10B:
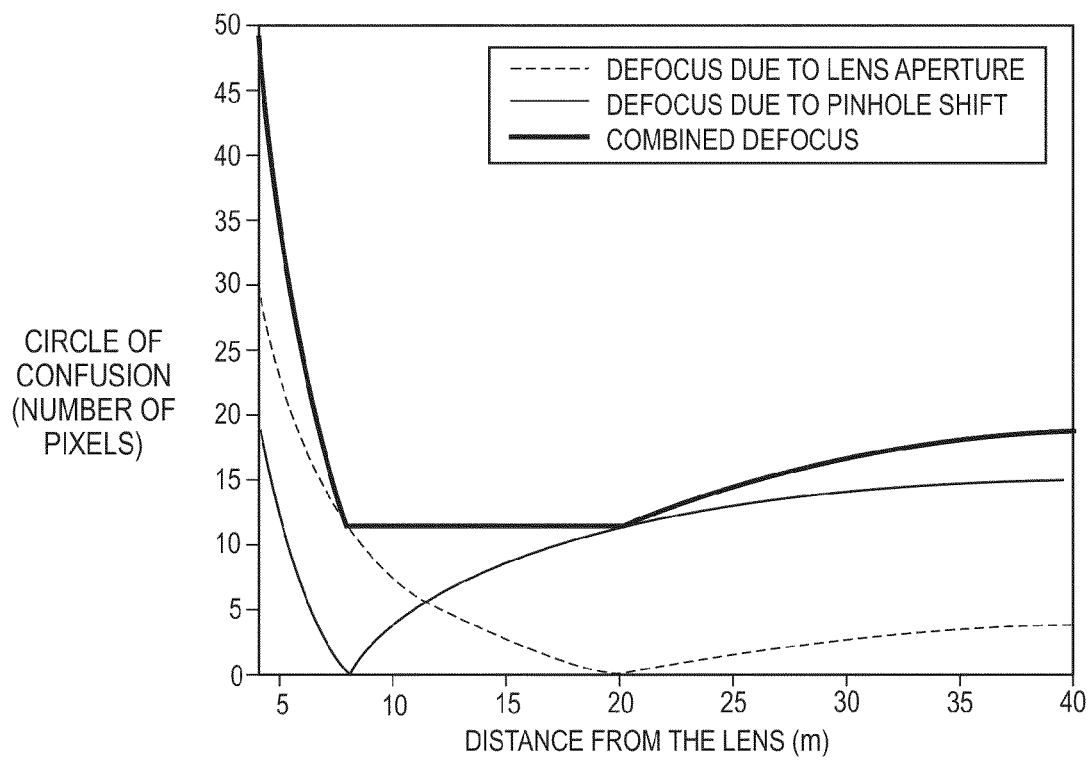

The more general case where $f_T \neq f_P$ results in a setup that cannot be duplicated with only a single fixed lens and sensor. In this case the two focusing mechanisms do not focus at identical planes. As a result, no single plane is focused on the sensor and the effective PSF for any scene depth is the convolution of the two individual PSFs for that depth. If $d_a^T$ and $d_a^P$ are the two in-focus planes for a physical lens and pinhole shift, respectively, then the size of the combined circle of confusion is approximately constant for all planes that lie between them, as shown in FIG. 10B. This results in a depth-invariant blur size for the specified range of scene distances. An approximately all-in-focus image may be obtained by deconvolving the constant blur kernel.

Thus, in exemplary implementations of this invention, in the case where $f_T \neq f_P$, synchronous translation of a lens and a sensor may be employed to capture an approximately depth-invariant blur size over a range of distances between two planes $d_a^T$ and $d_a^P$, where $d_a^T$ and $d_a^P$ are the two in-focus planes for a physical lens and pinhole shift. FIG. 10B illustrates the results of an example of such a configuration, with the lens focused at 20 m, and a 15 mm total lens displacement. In the example shown in FIG. 10 B, the cumulative blur size is approximately a constant for all distances in the range of 8 m to 20 m.

In the situation where $f_T \neq f_P$, the PSF generally varies with depth (even though the size of the circle of confusion is invariant to the depth). However, there is an exception to this general rule: If the PSFs for both the real and virtual focusing mechanisms have a Gaussian shape, then translation of the sensor and lens may be used to obtain an overall approximately depth-invariant Gaussian PSF for the combined setup. Thus, this invention may be implemented in such a way as to capture an approximately depth-invariant Gaussian PSF, in the special case of a Gaussian PSF for both the real and virtual focusing mechanisms.

The above discussion considered only situations where the sensor is parallel to the lens or to the motion direction of the pinhole. A different situation, where the sensor and lens are static and not parallel to one another, is well understood by the Scheimpflug principle. The plane of focus for such a setup is not parallel to either the lens or the sensor, and passes through the line of intersection formed by the extended planes containing the lens and the sensor as shown in FIG. 11A.

The Scheimpflug principle cannot be reproduced exactly by shifting the pinhole/lens and the sensor as discussed above. This is because the virtual focal length for the pinhole shift configuration, as shown in Equation 4, is a function of the pinhole-sensor separation $d_s$. While this does not affect the case where the sensor is parallel to the direction of the pinhole motion, the virtual focal length varies over the surface of a tilted sensor, thus violating the traditional Scheimpflug principle.

Figure 11:
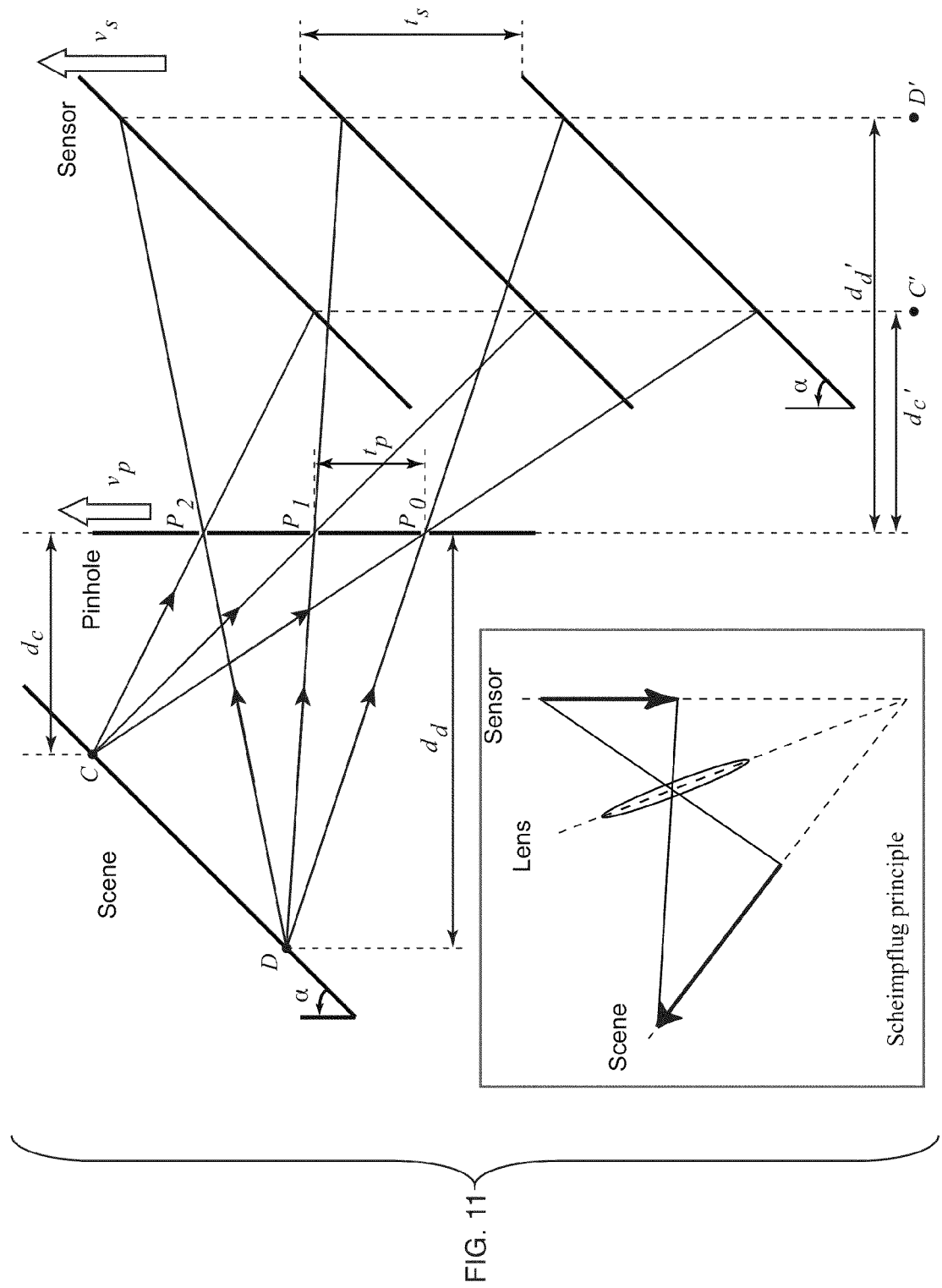
FIG. 11 is a diagram that shows a pinhole and a sensor being moved during an exposure, where the movement of the pinhole is not parallel to the alignment of the sensor, in an illustrative implementation of this invention.

However, in an illustrative implementation of this invention, similar results are obtained using a translating pinhole as shown in FIG. 11B. The sensor is tilted at an angle α. The sensor and lens move in parallel directions. Two points C and D focus on the image sensor over time. The geometric relationship between these points is given by:

$$\frac{d_c}{d_c + d_{c'}} = \frac{d_d}{d_d + d_{d'}} = \frac{t_p}{t_s} = \frac{v_p}{v_s}.$$

This gives the relation $$\frac{d_c}{d_{c'}} = \frac{d_d}{d_{d'}},$$

which implies that the line joining in-focus points C and D is parallel to the sensor (due to similar triangles). The setup focuses on a plane that is parallel to the sensor. The exact plane of focus depends on the ratio of the sensor velocity to the pinhole velocity $$\frac{v_s}{v_p},$$

and Equation 1 can be used to find it.

In an exemplary implementation of this invention, a translating lens can be used in place of the translating pinhole in FIG. 11B. A lens parallel to the sensor also focuses on a plane parallel to the sensor (the exact plane depends on the focal length of the lens). Once again, either (a) the virtual focal length can be matched to the physical focal length to enhance the defocus (bokeh), or (b) they may be kept different to produce a depth-invariant blur size across a scene.

The photographic results that may be achieved by this invention are striking

Figure 12:
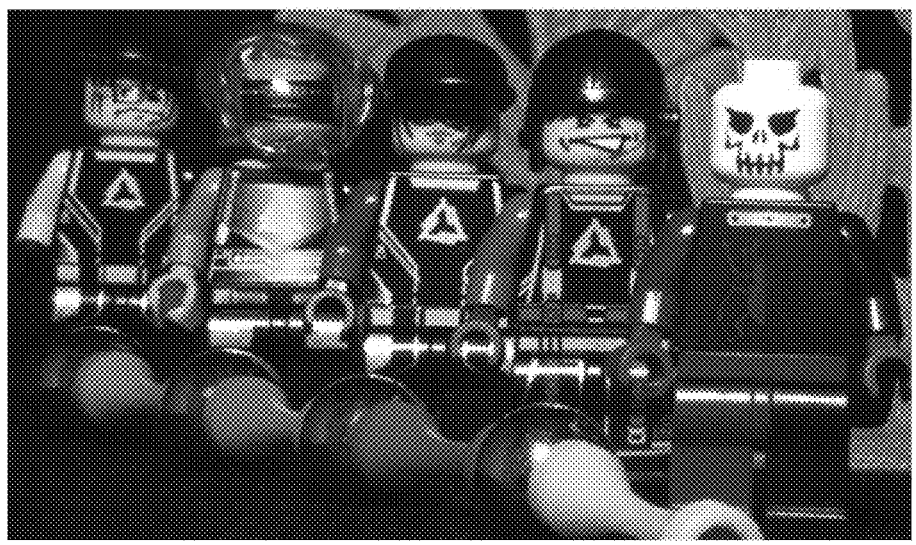
FIG. 12 is an all-in-focus photograph taken with a static lens with an f/22 aperture.
Figure 13:
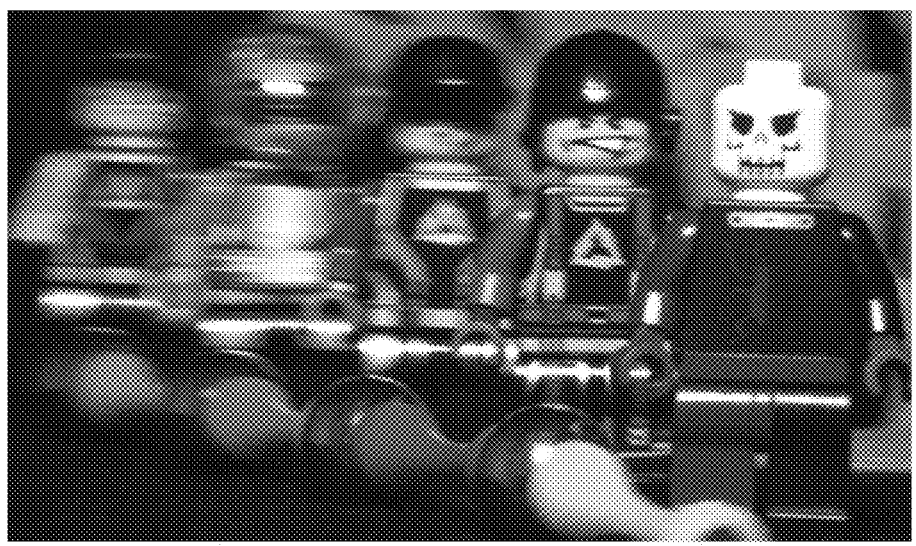
FIG. 13 is a photograph that is focused on the closest (front) toy in the scene. The photo was taken with a lens with an f/22 aperture, which lens was translated 10 mm during the exposure, in an illustrative implementation of this invention.
Figure 14:
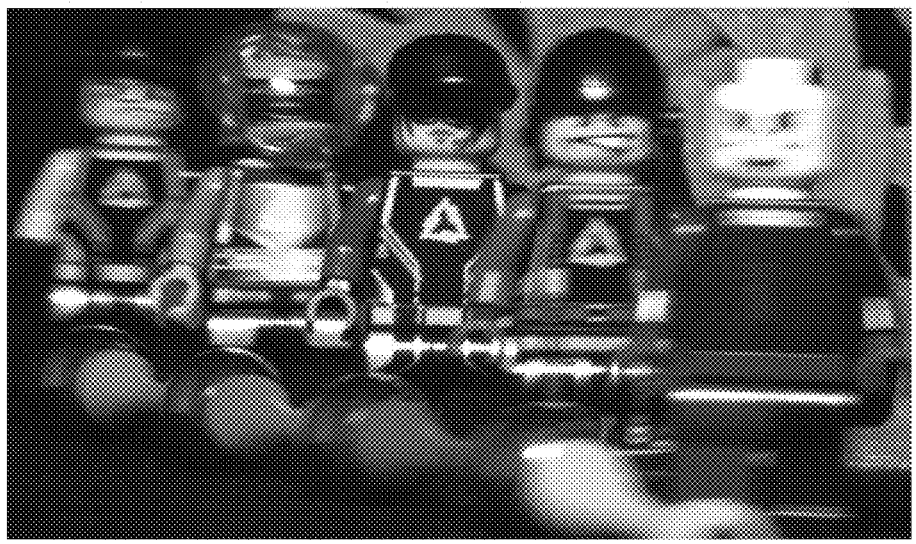
FIG. 14 is a photograph that is focused on the middle toy in the scene. The photo was taken with a lens with an f/22 aperture, which lens was translated 5 mm during the exposure, in an illustrative implementation of this invention.
Figure 15:
FIG. 15 is a photograph that is focused on the furthest (back) toy in the scene. The photo was taken with a lens with an f/22 aperture, which lens was translated 10 mm during the exposure, in an illustrative implementation of this invention.

FIGS. 12 through 15 are photographs taken by a prototype of this invention. They are basically pinhole images, taken using a lens stopped down to an f/22 aperture (which approximates a pinhole). In these Figures, toy figures are arranged at different depths from the camera, with depth increasing from right to left. FIG. 12 is an all-in-focus image, whereas in FIGS. 13, 14 and 15 only a portion of the scene appears in focus. FIG. 12 was taken while the lens and sensor were static. The photographs in FIGS. 13, 14 and 15 were captured while the sensor and lens were moving relative to the scene. For the photos in FIGS. 13, 14 and 15, the lens was translated 10 mm, 5 mm and 10 mm, respectively, during exposure. In these Figures, the front, middle and back figures, respectively, appear in sharp focus. FIGS. 13, 14 and 15 are examples of how shallow depth of field may be achieved by moving a sensor and lens during exposure.

In illustrative implementations of this invention (in which a sensor and a lens move relative to the scene), virtual focal length may be varied by adjusting the velocity ratio as per Equation 4, allowing various scene planes to be brought into focus in the different photos. The f-number reduces with increasing lens translation $t_p$ according to Equation 6.

FIGS. 16 to 20 are photographs taken by a prototype of this invention. These Figures illustrate PSFs observed in mirror ball reflections. The spheres are placed at increasing distances from the lens (from left to the right), and are illuminated by a single bright point light source. The PSF due to the translation of a lens and sensor is one-dimensional (1D) because, in this prototype, the translation is restricted to 1D.

Figure 16:
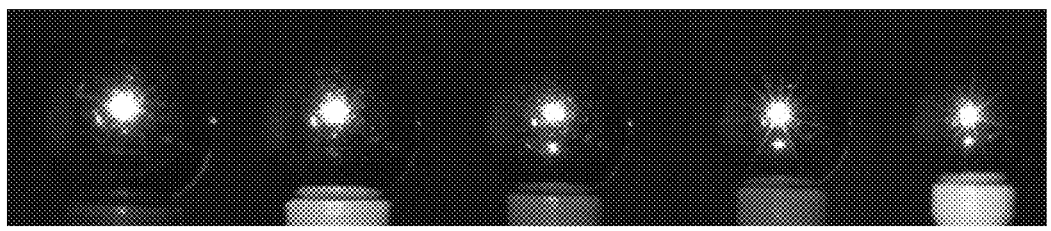
FIG. 16 is an all-in-focus photograph of mirror balls taken with a static lens with an f/22 aperture.
Figure 17:
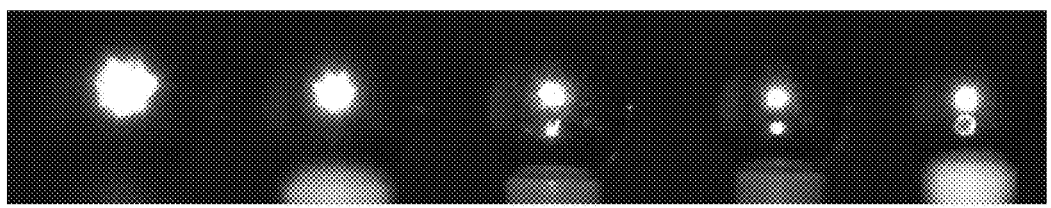
FIG. 17 is a photograph of mirror balls taken with a static lens with an f/2.8 aperture.

FIGS. 16 and 17 are photos that were taken with a static lens. FIG. 16 is an all-in-focus photograph taken with a static lens with an f/22 aperture (approximating a pinhole). FIG. 17 is a photograph taken with a static lens with an f/2.8 aperture, focused in the center.

Figure 18:
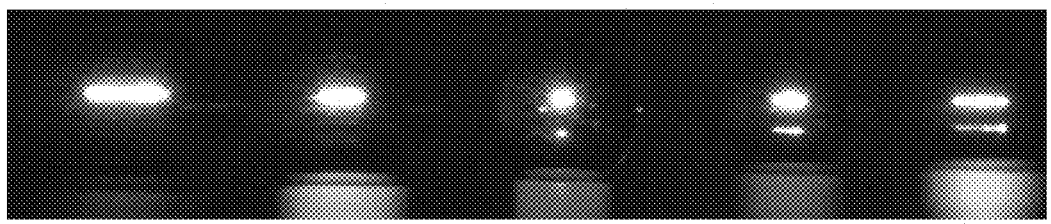
FIG. 18 is a photograph of mirror balls with the virtual focal plane is in the center, taken with a lens with an f/22 aperture. A lens and sensor were translated during the exposure, in an illustrative implementation of this invention.
Figure 19:
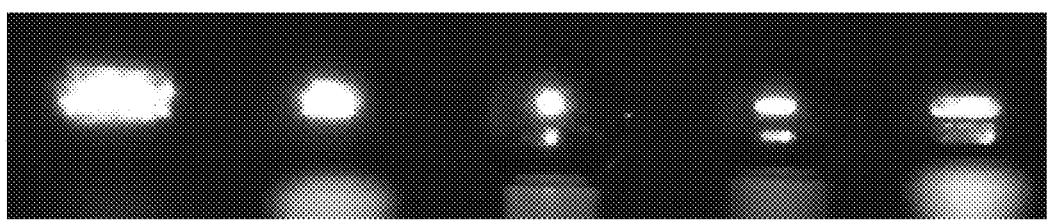
FIG. 19 is a photograph of mirror balls taken with a lens with an f/2.8 aperture. A lens and sensor were translated during the exposure, in an illustrative implementation of this invention.
Figure 20:
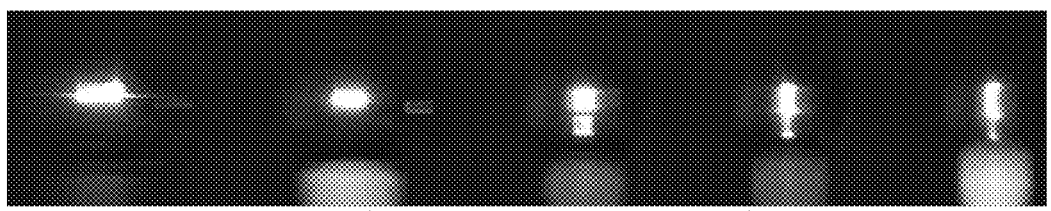
FIG. 20 is a photograph of mirror balls taken with a lens with a vertical slit aperture. A lens and sensor were translated during the exposure, in an illustrative implementation of this invention.

For the photos in FIGS. 18, 19 and 20, the lens and sensor were translated relative to the scene during the exposure. The photo in FIG. 18 was taken with a lens with an f/22 aperture; whereas the photo in FIG. 18 was taken with a lens with an f/2.8 aperture; focused in the center. For the photo in FIG. 20, a vertical slit aperture was used.

According to principles of this invention, physical and virtual blurs may be made orthogonal in order to produce strongly depth-dependent PSF. For example, a vertical slit was used when taking the photo in FIG. 20, in order to create orthogonal physical and virtual blurs.

The photo in FIG. 20 shows strong astigmatism. The PSF in that photo changes from horizontal for points close to the camera (due to the virtual aperture) to vertical for points further away (due to the physical lens). In exemplary implementations of this invention, the same lens that is used to take a regular photo may also be translated to take an astigmatic photo, by simply changing the $$\frac{v_s}{v_p}$$

ratio. This is an advantage over conventional aspheric lens, which cannot be used to take regular photos.

Figure 21:
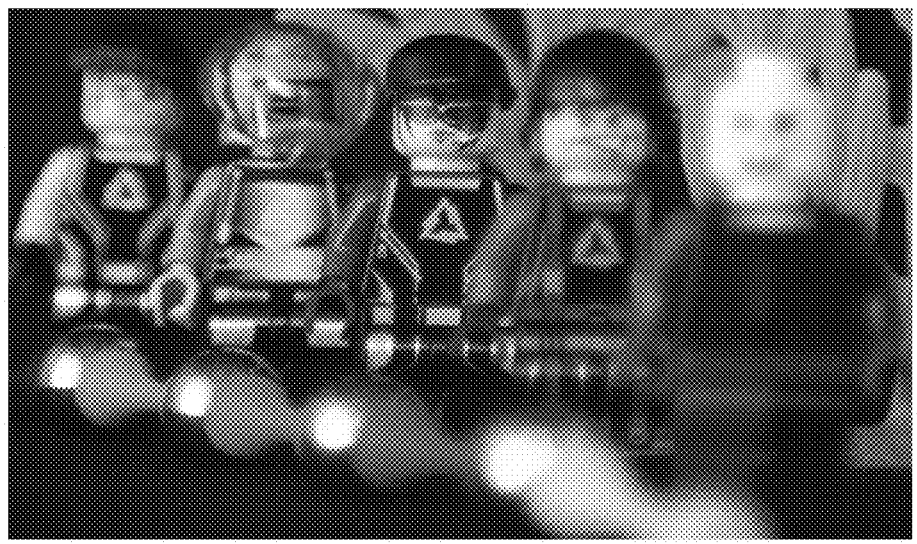
FIG. 21 is a photograph of toy figures taken with a static lens with an f/2.8 aperture.
Figure 22:
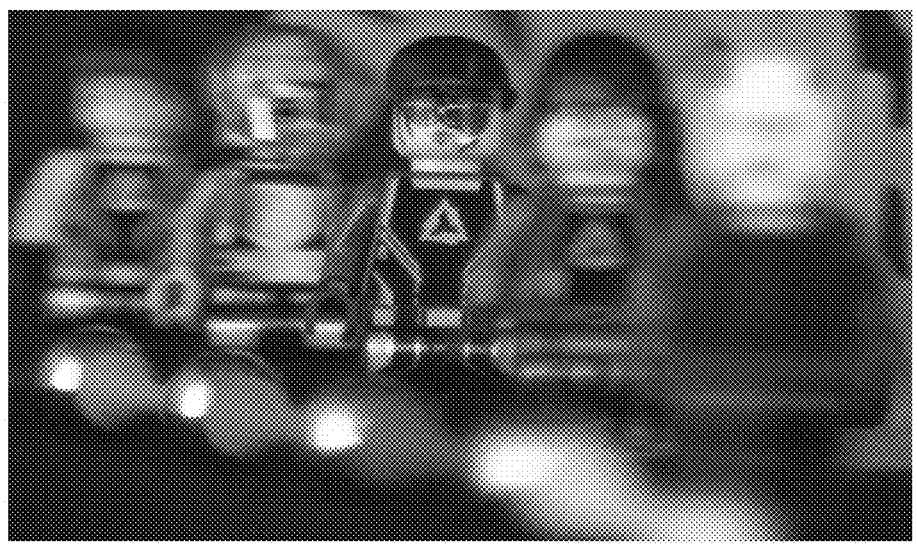
FIG. 22 is a photograph of toys. A lens and sensor were translated during the exposure, in an illustrative implementation of this invention.

The photos in FIGS. 21 and 22 were taken by a prototype of this invention. They show the same toy figures as FIGS. 12 to 15. FIG. 21 was taken with a static lens with an f/2.8 aperture. For the photo in FIG. 22, a lens and sensor were translated (relative to the scene) during the exposure. Synchronized translation of the lens and sensor simulates the effect of a larger virtual aperture. The depth of field is shallower, and the bokeh is visually pleasing both in front of and behind the plane of focus. The coordinated translation (of sensor and lens) effectively applies a low-pass filter that removes high-frequency artifacts due to spherical aberration.

Figure 23:
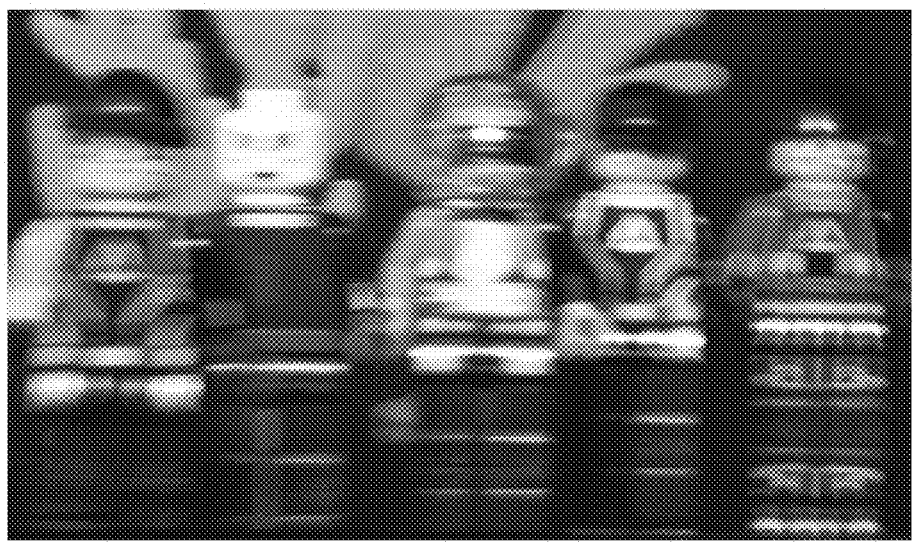
FIG. 23 is a photograph of toys taken with a lens with a horizontal slit aperture. A lens and sensor were translated during the exposure, in an illustrative implementation of this invention.
Figure 24:
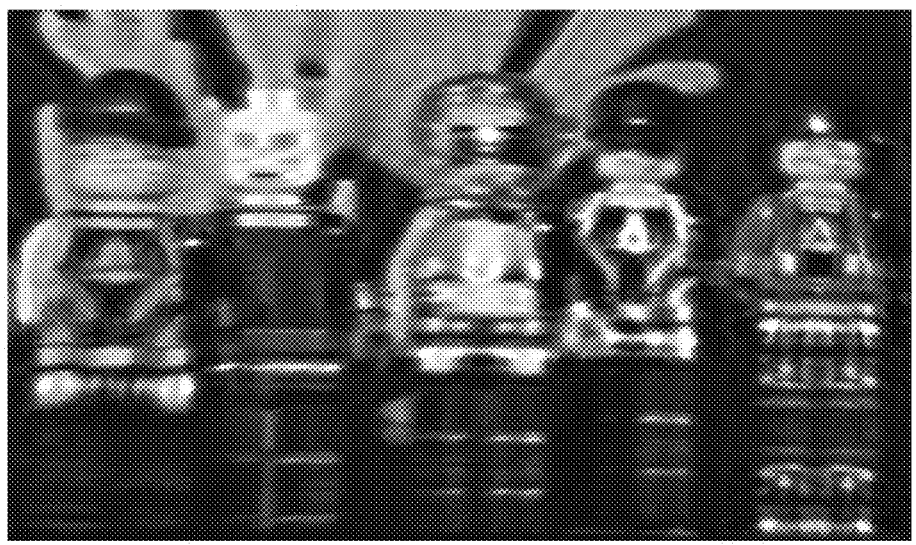
FIG. 24 is a photograph of toys. For this photo, Richardson-Lucy deconvolution results in an approximately all-in-focus image, in an illustrative implementation of this invention.

The photos in FIGS. 23 and 24 were taken by a prototype of this invention. They show the same toy figures as FIGS. 12 to 15.

For the photos in FIGS. 23 and 24, an approximately depth-invariant blur size was achieved by matching the physical blur kernel due to the lens aperture and the virtual blur kernel due to translating lens and sensor. A horizontal slit was placed on the lens to make the PSF purely one dimensional. The lens was physically focused on the closest figure from the camera, and the virtual focal plane was at the farthest figure. As shown in FIG. 23, the resulting blur size was approximately depth-invariant. This allowed the application of non-blind image deconvolution. The photo in FIG. 24 is an example of the results of such deconvolution. For that photo, Richardson-Lucy deconvolution was employed to recover an approximately all-in-focus image.

In exemplary implementations of this invention, the defocus effects may be programmable.

This invention may be implemented in ways other than the examples described above.

For example, rather than have a lens and sensor move at substantially constant velocities, the velocity profiles of the lens and sensor may be varied over time. These variations in velocity may be employed to shape PSF and to control defocus (bokeh) characteristics. Also, non-planar focal surfaces may be obtained using non-linear motion of a sensor and lens.

Also, for example, in a prototype discussed above, the movement of a lens and sensor are one dimensional (1D). These movements may instead by two-dimensional, such as in a circular, elliptical, hypocycloidal or spiral trajectory. In some implementations, limited sampling may be done for certain 2D motions.

Also, for example, this invention may be implemented in such a way that actuators in a cell phone camera (or small point-and-shoot camera) move a lens and a sensor in the camera, during an exposure.

Also, for example, this invention may be implemented with actuators of a type used for image stabilization in existing cameras.

Also, for example, this invention may be implemented by simultaneously (a) moving the camera body relative to the scene being imaged and (b) moving either the sensor or the lens (but not both the sensor and the lens) relative to the camera body and also relative to the scene being imaged.

Conclusion

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A camera that includes one or more actuators for causing a lens of the camera to undergo a lens movement, and an imaging sensor of the camera to undergo a sensor movement, in each case relative to a scene being imaged, such that:
   (a) the movements are in parallel directions and occur throughout an exposure in which the camera captures an image;
   (b) throughout the exposure, the lens movement is in a first direction and the sensor movement is in a second direction, the first direction being parallel to the second direction;
   (c) the movements cause the camera to have a larger effective aperture size and shallower depth of field than the camera would have in the absence of the movements; and
   (d) adjustment of a velocity ratio $v_p/v_s$, where $v_s$ is velocity of the sensor movement and $v_p$ is velocity of the lens movement, causes different scene planes to be brought into focus.

2. The camera of claim 1, wherein the plane of the sensor, the plane of the lens, the direction of motion of the sensor, and the direction of motion of the lens are all parallel to each other.

3. The camera of claim 1, wherein the plane of the sensor is parallel to the plane of the lens but is not parallel to the direction of motion of the lens.

4. The camera of claim 1, wherein:
   (a) the lens movement and sensor movement create a second virtual lens;
   (b) the lens has a real focal length and the virtual lens has a virtual focal length; and
   (c) the real focal length and virtual focal length are equal.

5. The camera of claim 1, wherein at least one of the actuators is a stepper motor.

6. The camera of claim 1, wherein at least one of the actuators is piezoelectric.

7. The camera of claim 1, wherein at least one of the actuators is ultrasonic.

8. The camera of claim 1, wherein at least one of the actuators is further adapted for moving at least one lens or sensor of the camera under certain circumstances, in such a way as to compensate for motion of the camera.

9. The camera of claim 1, wherein, throughout the exposure:
   (a) the lens movement has a first velocity and the sensor movement has a second velocity; and
   (b) the first and second velocities are each constant.

10. The camera of claim 1, wherein the movements cause a scene point to be imaged from different angles during the exposure.

11. The camera of claim 1, wherein the movements are circular, elliptical, hypocycloidal or spiral.

12. The camera of claim 1, wherein the movement of the lens and the sensor is programmable.

13. The camera of claim 1, wherein, throughout the exposure:
   (a) the lens movement has a first velocity and the sensor movement has a second velocity; and
   (b) the ratio of the first velocity to the second velocity is constant.

14. A camera that includes one or more actuators for causing a lens of the camera to undergo a lens movement, and an imaging sensor of the camera to undergo a sensor movement, in each case relative to a scene being imaged, such that:
   (a) the movements are in parallel directions and occur throughout an exposure in which the camera captures an image;
   (b) throughout the exposure, the lens movement is in a first direction and the sensor movement is in a second direction, the first direction being parallel to the second direction;
   (c) the movements cause the camera to have a larger effective aperture size and shallower depth of field than the camera would have in the absence of the movements; and
   (d) the lens movement comprises the lens traveling a distance $t_p$ at a velocity $v_p$, the sensor movement comprises the sensor traveling at a velocity $v_s$, and the movements cause the camera to have an effective f-number $N_L$ such that $$\frac{1}{N_L} = \frac{1}{N_T} + \frac{1}{N_P},$$

where $N_T$ is the f-number of the camera at rest, $d_s$ is distance between the sensor and the lens, and $$N_P = \left(\frac{v_p}{v_s}\right)\left(\frac{d_s}{t_p}\right).$$

15. The camera of claim 14, wherein:
   (a) the camera has a virtual focal length $f_p$ and
   (b) during the exposure, $$f_p = \left(\frac{v_p}{v_s}\right)d_s$$

where $d_s$ is distance between the sensor and the lens.

16. The camera of claim 14, wherein, during the single exposure, the camera has a point spread function (PSF) which is equal to a convolution of a first PSF and a second PSF, the first PSF being the PSF of the lens and the second PSF being a virtual PSF arising due to the movements.

17. The camera of claim 14, wherein the movements cause a scene point to be imaged from different angles during the exposure.

18. The camera of claim 14, wherein, throughout the exposure:
   (a) the lens movement has a first velocity and the sensor movement has a second velocity; and
   (b) the ratio of the first velocity to the second velocity is constant.

19. A camera that includes one or more actuators for causing a lens of the camera to undergo a lens movement, and an imaging sensor of the camera to undergo a sensor movement, in each case relative to a scene being imaged, such that:
   (a) the movements are in parallel directions and occur throughout an exposure in which the camera captures an image;
   (b) throughout the exposure, the lens movement is in a first direction and the sensor movement is in a second direction, the first direction being parallel to the second direction;
   (c) the movements cause the camera to have a larger effective aperture size and shallower depth of field than the camera would have in the absence of the movements; and
   (d) the lens movement comprises the lens traveling a distance $t_p$ at a velocity $v_p$, the sensor movement comprises the sensor traveling at a velocity $v_s$, and the movements cause the camera to have an effective f-number $N_L$ such that $$\frac{1}{N_L} > \frac{1}{N_T},$$

where $N_T$ is the f-number of the camera at rest.

* * * * *